United States Patent [19]

Weder et al.

[11] Patent Number: 5,628,164
[45] Date of Patent: May 13, 1997

[54] FLORAL CONTAINER HAVING A WATER-IMPERMEABLE EXTERNAL LAYER

[75] Inventors: Donald E. Weder, Highland; William F. Straeter, Breese, both of Ill.

[73] Assignee: Southpac Trust International, Inc., Oklahoma City, Okla.

[21] Appl. No.: 438,676

[22] Filed: May 10, 1995

Related U.S. Application Data

[60] Continuation of Ser. No. 415,263, Apr. 3, 1995, Pat. No. 5,515,644, which is a division of Ser. No. 53,062, Apr. 26, 1993, Pat. No. 5,402,599, which is a continuation-in-part of Ser. No. 941,992, Sep. 8, 1992, Pat. No. 5,410,856, Ser. No. 949,175, Sep. 22, 1992, Pat. No. 5,339,601, Ser. No. 934,832, Aug. 24, 1992, Pat. No. 5,426,914, and Ser. No. 940,930, Sep. 4, 1992, Pat. No. 5,361,482, which is a continuation-in-part of Ser. No. 926,098, Aug. 5, 1992, which is a continuation-in-part of Ser. No. 803,318, Dec. 4, 1991, Pat. No. 5,344,016, which is a continuation-in-part of Ser. No. 707,417, May 28, 1991, abandoned, which is a continuation of Ser. No. 502,358, Mar. 29, 1990, abandoned, which is a continuation-in-part of Ser. No. 391,463, Aug. 9, 1989, abandoned, which is a continuation-in-part of Ser. No. 249,761, Sep. 26, 1988, abandoned, said Ser. No. 934,832, is a continuation of Ser. No. 819,311, Jan. 9, 1992, abandoned, which is a continuation of Ser. No. 765,416, Sep. 26, 1991, Pat. No. 5,105,599, which is a continuation of Ser. No. 530,491, May 29, 1990, abandoned, which is a continuation of Ser. No. 315,169, Feb. 24, 1989, abandoned.

[51] Int. Cl.$^6$ ................................................ B65B 25/02
[52] U.S. Cl. ............................. 53/397; 53/416; 53/449
[58] Field of Search .......................... 53/397, 399, 449, 53/416, 461, 390, 219, 218, 592, 170; 206/423; 47/41.12, 41.01, 41.1

[56] References Cited

U.S. PATENT DOCUMENTS

| | | | |
|---|---|---|---|
| 2,039,986 | 5/1936 | Gardner | 206/423 X |
| 2,745,218 | 5/1956 | Cruce | 47/41 |
| 2,774,187 | 12/1956 | Smithers | 47/41 |
| 2,948,457 | 8/1960 | Thiele | 229/62 |
| 3,073,062 | 1/1963 | Hoffman | 47/41 |
| 3,288,055 | 11/1966 | Vellrath | 100/4 |
| 3,314,194 | 4/1967 | Halleck | 206/423 X |
| 3,515,055 | 6/1970 | Timmerbeil et al. | 100/3 |
| 3,552,059 | 1/1971 | Moore | 47/41.12 |

(List continued on next page.)

FOREIGN PATENT DOCUMENTS

| | | |
|---|---|---|
| 997966 | 2/1968 | Australia . |
| 0241341 | 10/1987 | European Pat. Off. . |
| 2609720 | 7/1988 | France . |
| 2610604 | 8/1988 | France . |
| 2735225 | 4/1978 | Germany . |
| 15550 | of 1899 | United Kingdom . |
| 1455861 | 11/1976 | United Kingdom . |
| 2193909 | 2/1988 | United Kingdom ............ 47/41.12 |

OTHER PUBLICATIONS

"Oasis Grower Products", Smithers–Oasis Catalog, 1991, 18 pages.

Exhibits O&P –Rubber Band Technology, Ltd. Yakima WA, Band Master 101, Model MF and 102, Model ET (2 pages, No Date).

Exhibit Q –Rubber Band Technology Ltd., Yakima, WA, Band Master, 201 Model B (one page, no date).

(List continued on next page.)

*Primary Examiner*—James F. Coan
*Attorney, Agent, or Firm*—Dunlap & Codding, P.C.

[57] ABSTRACT

A floral container having a water-impermeable external layer for a floral grouping comprising a holding material and having a water-impermeable external surface layer. The holding material is constructed of a material capable of receiving a portion of a floral grouping, botanical item or propagule and supporting the botanical item, floral grouping or propagule. A sheet of material may be extended about a portion of the holding material and a crimped portion or bonded portion is formed in the sheet of material with the crimped portion or the bonded portion cooperating to hold the sheet of material about the holding material to provide a decorative cover. A bond or other tying device may also be used to bond the sheet of material to the flower pot.

50 Claims, 7 Drawing Sheets

U.S. PATENT DOCUMENTS

| | | | |
|---|---|---|---|
| 3,962,503 | 6/1976 | Crawford | 428/40 |
| 4,086,117 | 4/1978 | Pearsall | 156/212 |
| 4,209,945 | 7/1980 | Dent et al. | 47/84 |
| 4,445,298 | 5/1984 | Roder | 47/41.12 |
| 4,570,415 | 2/1986 | Centeno | 53/399 |
| 4,901,423 | 2/1990 | Weder | 29/432 |
| 5,035,105 | 7/1991 | Qvarnstrom | 53/448 |
| 5,077,937 | 1/1992 | Weder et al. | 47/72 |
| 5,105,599 | 4/1992 | Weder | 53/399 |
| 5,111,638 | 5/1992 | Weder | 53/397 |
| 5,125,564 | 6/1992 | Capy | 229/87.03 |
| 5,129,182 | 7/1992 | Weder | 47/72 |
| 5,181,364 | 1/1993 | Weder | 53/397 |
| 5,184,390 | 2/1993 | Weder | 29/525 |
| 5,231,794 | 8/1993 | Weder | 47/72 |

OTHER PUBLICATIONS

Exhibit R –B.H. Bunn Company, Alsip, IL, Strapping Efficiency for Every Strapping Application, brochure No. M20M–475 (six pages, no date).

Exhibit S –B.H. Bunn Company, Lakeland, FL, Bunn Models 1691, 1991, 2091, 2491, and 3091 Tying Machines brochure, Copyright 1992 (three pages).

Exhibit T –EAM Industries, W. Hazelton, PA, EAM Mosca Strapping System brochure (six pages, no date).

Exhibit U –EAM Industries, W. Hazelton, PA, COM Taping Machine brochure (two pages, no date).

Exhibit W –Clements Industries, Inc., South Hackensack, NJ, Tach–It Twisters, Model 3558 advertisement (one page, 1986).

Exhibit X –InterPower Packaging, Hodgkins, IL, Akebono OB–300 brochure (two pages, no date).

Exhibit Y –InterPower Packaging, Hodgkins, IL, Power 260 brochure (two pages, 1991).

Exhibit Z –The John Henry Company, Cellocoup Brochure, copyright 1992 (four pages).

Exhibit AA –Saxmayer Corporation, St. Blissfield, MI, Twine Tying Machines brochure (seven pages, no date).

Exhibit BB –Saxmayer Corporation, St. Blissfield, MI, Model 6 String Tyer brochure (two pages, no date).

Exhibit CC –Saxmayer Corporation, St. Blissfield, MI, Model EM Route–Master brochure (two pages, no date).

Exhibit DD –Felins, Inc., Milwaukee, WS, Pak–Tyer 2000 brochure (four pages, 1991).

Exhibit EE –"Color Them Happy With Highlander Products", ©1992, 2 pages.

Exhibit FF –"Super Seller", Supermarket Floral, Sep. 15, 1992.

Exhibit GG –"Costa Keeps The Christmas Spirit", Supermarket, Sep. 15, 1992.

Exhibit HH –"Now, More Than Ever", Supermarket Floral, Sep. 15, 1992.

Exhibit II –"Halloween", Link Magazine, Sep. 1992, 2 pages.

Exhibit JJ –Speed Cover® Brochure, "The Simple Solution For Those Peak Volume Periods", Highland Supply Speed Cover® Brochure, ©1989, 6 pages.

Exhibit KK –"Speed Sheets® And Speed Rolls", Highland Supply Speed Sheets® Brochure, 1990©, 2 pages.

FLORAL CONTAINER HAVING A WATER-IMPERMEABLE EXTERNAL LAYER

The present application is a continuation of Ser. No. 08/415,263, filed Apr. 3, 1995, entitled FLORAL CONTAINER HAVING A WATER IMPERMEABLE EXTERNAL LAYER, now U.S. Pat. No. 5,515,644, which is a divisional of U.S. Ser. No. 08/053,062, filed Apr. 26, 1993, entitled FLORAL CONTAINER HAVING A WATER IMPERMEABLE EXTERNAL LAYER, now U.S. Pat. No. 5,402,599, issued Apr. 4, 1995, which is a continuation-in-part of U.S. Ser. No. 07/941,992, filed Sep. 8, 1992, entitled DECORATIVE ASSEMBLY FOR A FLORAL GROUPING, now U.S. Pat. No. 5,410,856, issued May 2, 1995. Said application Ser. No. 08/053,062 is also a continuation-in-part of U.S. Ser. No. 07/949,175, filed Sep. 22, 1992, entitled DECORATIVE COVER WITH BAND, now U.S. Pat. No. 5,339,601, issued Aug. 23, 1994.

Said application Ser. No. 08/053,062 is also a continuation-in-part of U.S. Ser. No. 07/934,832, filed Aug. 24, 1992, entitled BAND APPLICATOR FOR APPLYING A BAND ABOUT A SHEET OF MATERIAL AND A POT, now U.S. Pat. No. 5,426,914, which is a continuation of U.S. Ser. No. 07/819,311, filed Jan. 9, 1992, entitled MEANS FOR SECURING A DECORATIVE COVER ABOUT A FLOWER POT, now abandoned, which is a continuation of U.S. Ser. No. 07/765,416, filed Sep. 26, 1991, entitled MEANS FOR SECURING A DECORATIVE COVER ABOUT A FLOWER POT, now U.S. Patent No. 5,105,599, issued Apr. 21, 1992, which is a continuation of U.S. Ser. No. 07/530,491, filed May 29, 1990, entitled MEANS FOR SECURING A DECORATIVE COVER ABOUT A POT, now abandoned, which is a continuation of U.S. Ser. No. 07/315,169, filed Feb. 24, 1989, entitled MEANS FOR SECURING A DECORATIVE COVER ABOUT A POT, now abandoned.

Said application Ser. No. 08/053,062 is also a continuation-in-part of U.S. Ser. No. 07/940,930, filed Sep. 4, 1992, entitled FLOWER POT COVER WITH CRIMPED PORTION, now U.S. Pat. No. 5,361,482, issued Nov. 8, 1994, which is a continuation-in-part of U.S. Ser. No. 07/926,098, filed Aug. 5, 1992, entitled METHOD AND APPARATUS FOR FORMING A DECORATIVE COVER, which is a continuation-in-part of U.S. Ser. No. 07/803,318, filed Dec. 4, 1991, entitled WRAPPING MATERIAL FOR WRAPPING A FLORAL GROUPING HAVING STAGGERED STRIPS OF ADHESIVE APPLIED THERETO AND METHOD, now U.S. Pat. No. 5,344,016, issued Sep. 6, 1994, which is a continuation-in-part of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned, which is a continuation of U.S. Ser. No. 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is a continuation-in-part of U.S. Ser. No. 07/391,463, filed Aug. 9, 1989, entitled ADHESIVE APPLICATOR, now abandoned, which is a continuation-in-part of U.S. Ser. No. 07/249,761, filed Sep. 26, 1988, entitled METHOD FOR WRAPPING AN OBJECT IN A MATERIAL HAVING PRESSURE SENSITIVE ADHESIVE THEREON, now abandoned.

FIELD OF THE INVENTION

The present invention relates generally to a shaped floral holding material having a water-impermeable external layer and, more particularly, but not by way of limitation, to a foam-type floral holding material having a glazed or lacquered external surface which is substantially impermeable to water.

BRIEF DESCRIPTION OF THE DRAWINGS

FIG. 18 is a perspective view of the floral container of FIG. 17 after having been subdivided into portions.

FIG. 19 is a perspective view of another floral container constructed in accordance with the present invention.

DESCRIPTION

The present invention contemplates a formed floral holding material having a glazed or lacquered outer surface layer which is substantially impermeable to water. In essence, the formed floral holding material acts as its own pot, vase or container for containing floral or botanical elements. The water impermeable external surface eliminates the necessity of placing the formed floral holding material within a separate pot, container or covering for the purpose of retaining water and nutrients within the formed floral material as would otherwise be required.

Embodiments of FIGS. 1-13

Figure 1:
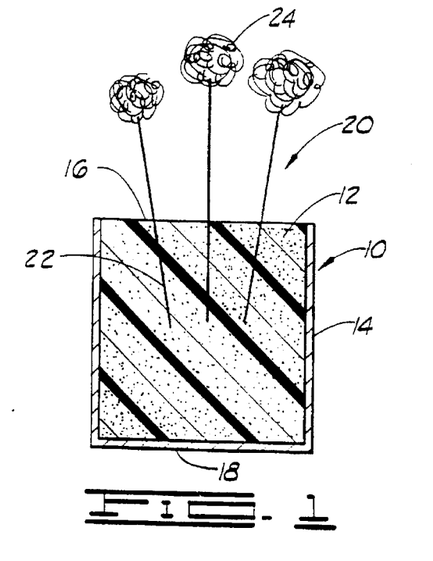
FIG. 1 is a sectional view of a floral container constructed in accordance with the present invention.
Figure 1E:
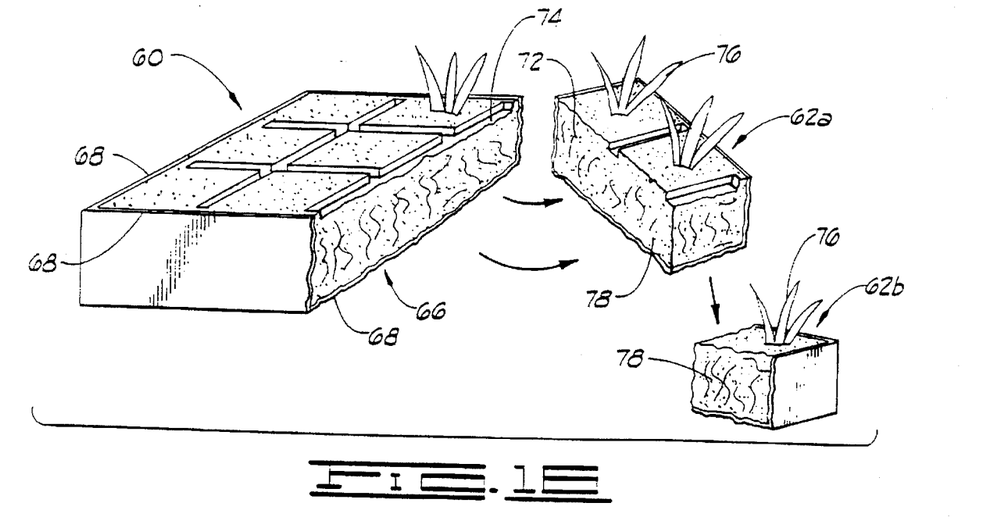
Figure 1F:
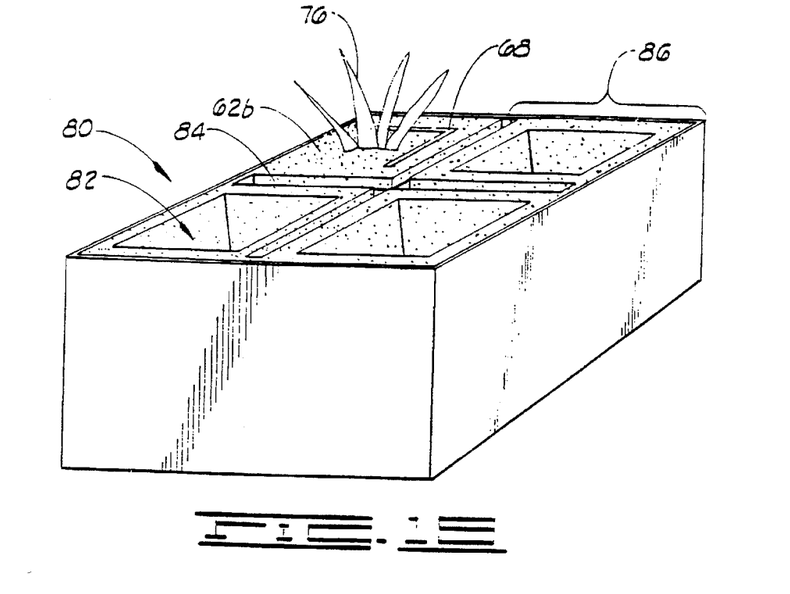

Shown in FIG. 1 and designated by the general reference number 10 is a floral container. The floral container 10 further comprises a floral holding material 12 having an external surface layer 14. The floral container 10 has an upper end 16 and a lower end 18. The floral container 10 shown in FIG. 1 is rectangular shaped, although the floral container 10 may be any shape desired in any particular application, for example spherical, frusto-conical, cylindrical, vase-shaped or other geometric shapes. The floral holding material 12 of the floral container 10 is constructed of a material capable of receiving a portion of a floral grouping 20 and holding or supporting the floral grouping 20 without any pot means such as a separate flower pot for example.

The water-impermeable external surface layer 14 may be comprised of one of any number of commercially available compounds which can be used to coat the external surface of the floral container 10 as long as the lacquer does not result in decomposition of the floral container. For example, the coating may be a commercially available polyurethane-type or polyester isocyanate compound. The coating may be moisture-curable. The impermeable external surface layer 14 may be produced by briefly heating the external layer of the floral container 10 to cause a hardened glazing.

The external surface layer 14 may be undecorated or decorated (not shown). The decorations could be decorations with inks, ribbons, sequins, ceramics, sheets of material, plastic attachments, or any of a number of other decorative features.

The floral holding material 12 may be the type of material commonly referred to in the art as floral foam or Oasis™ or may be soil or artificial soil or other earth composition so long as the material is capable of holding its predetermined shape and capable of receiving and supporting the floral grouping 20 without any additional pot means. In the preferred embodiment, the floral holding material 12 is capable of receiving and holding an irrigant for supplying the floral grouping 20, or propagule or botanical item disposed therein.

By the term "irrigant" is meant any aqueous solution used to irrigate the propagule or botanical item disposed within the holding material. The irrigant may be tap water or may further comprise water having fertilizers, salts, nutrients, hormones, or other substances dissolved or suspended therein.

As shown in FIG. 1, the floral grouping 20 has a stem end 22 and a bloom end 24. A portion of the stem end 22 of the floral grouping 20 is extended into the floral holding material 12. The bloom end 24 of the floral grouping 20 extends a distance above the floral holding material 12.

"Floral grouping" as used herein means a botanical item or propagule and may include other secondary plants and/or natural or synthetic ornamental materials which add to the aesthetics of the overall floral grouping.

The term "botanical item" as used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" as used herein means any structure capable of being propagated or acting as an agent of reproduction including seeds, shoots, stems, runners, tubers, plants, leaves, roots or spores.

The external surface layer 14 could be composed of a material which could be permeated or destroyed by activation with a solvent or with microbes able to degrade the layer 14.

Figure 2:
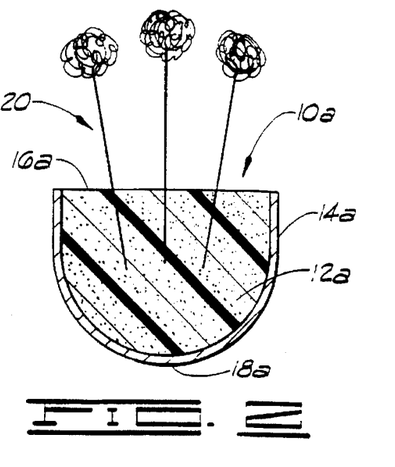
FIG. 2 is a sectional view of another floral container.
Figure 3:
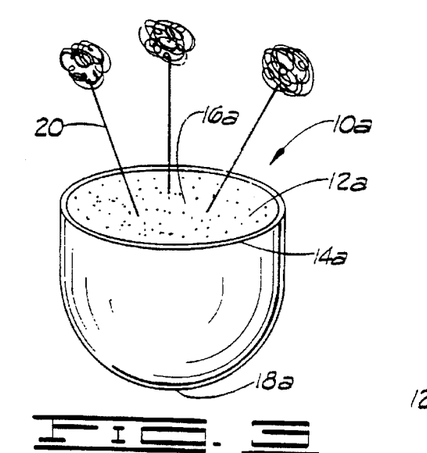
FIG. 3 is a perspective view of the floral container of FIG. 2.

As mentioned above, the floral holding material 12, as shown in FIG. 1, is generally rectangularly shaped. The floral container 10a shown in FIGS. 2 and 3 is constructed exactly like the floral container 10 shown in FIG. 1 and described in detail before, except the floral container 10a has a generally spherical shape as compared to the rectangular shape shown in FIG. 1 with respect to the floral container 10. The floral container 10a is comprised of a formed floral holding material 12a having an external surface layer 14a exactly like the layer 14, an upper end 16a and a lower end 18a. A flat portion may be formed on the lower end 18a of the floral container 10a so that the floral container 10a may be supported more easily on a flat surface such as on a table (not shown) for example.

Figure 4:
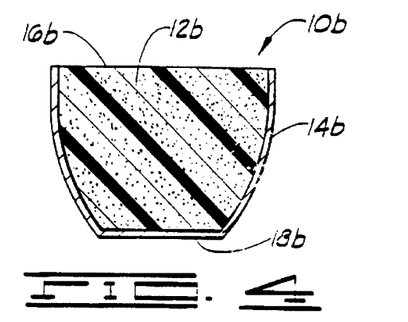
FIG. 4 is a sectional view of yet another floral container.

Shown in FIG. 4 is a modified floral container 10b which is constructed exactly like the floral container 10 shown in FIG. 1 and described in detail before, except the floral container 10b is in the shape of a solid basket comprising a floral holding material 12b having an external surface layer 14b and with a flat upper end 16b and having a flat lower end 18b for resting on a surface.

Figure 5:
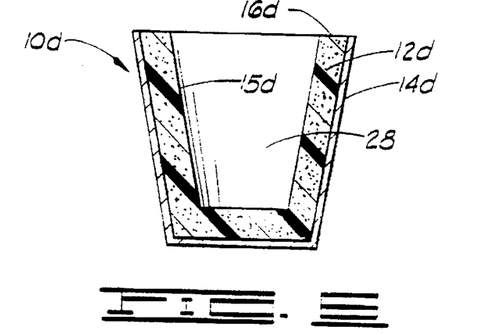
FIG. 5 is a perspective view of another floral container constructed in accordance with the present invention and having a support mesh.

Shown in FIG. 5 and designated by the general reference numeral 10c is a floral container constructed exactly like the floral holding container 10 shown in FIG. 1 and described in detail before, except the floral container 10c has a generally cylindrical shape having an upper end 16c. In addition, beneath the external surface layer 14c which is exactly like layer 14 is a reinforcing structure 26 for providing support and reinforcement of the floral holding material 12c which comprises the bulk of the floral container 10c. In FIG. 5 the embodiment is a mesh-like material which may be comprised of fibers or wire which may be of a plastic, metal or natural or synthetic fibrous composition.

Figure 6:
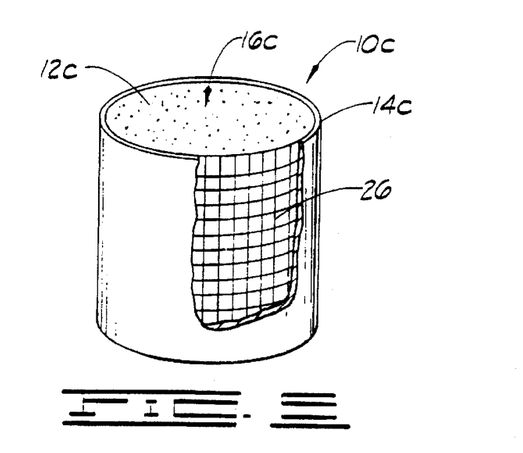
FIG. 6 is a sectional view of another floral container constructed in accordance with the present invention and having an internal cavity.

Shown in FIG. 6 and designated by the general reference number 10d is a floral container constructed of the same floral holding material and hereby designated as 12d as comprises the container 10 in FIG. 1. The floral container 10d has an external surface layer 14d which is exactly like the layer 14 and an inner surface 15d and may have a reinforcing structure (not shown) beneath the external surface layer 14d. The container 10d has a cavity 28 which extends from an opening in the upper end 16d a distance into the floral container 10d thereby forming a hollow area in the container 10d. The hollow floral container 10d may have a frusto-conical shape, or it may be rectangular or cylindrical or another applicable shape.

Figure 7:
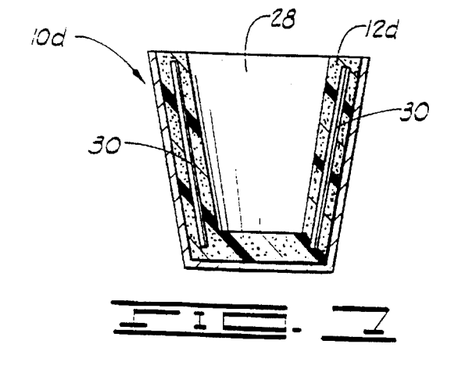
FIG. 7 is a sectional view of the floral container of FIG. 6 which additionally has internal support rods.

The floral container 10d may also contain a reinforcing structure such as a mesh (not shown) or one or more bars or rods 30 as indicated in FIG. 7 for providing support to the floral holding material 12d.

Figure 8:
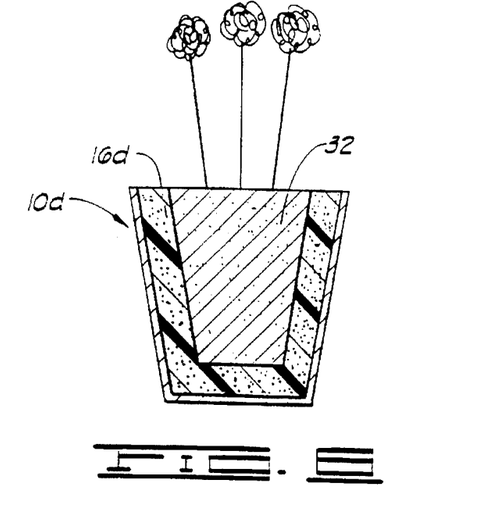
FIG. 8 is a sectional view of the floral container of FIG. 6 having a growth medium disposed therein.

As shown in FIG. 8, the cavity 28 of the floral container 12d may be filled with a growing medium 32. The term "growing medium" used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

Figure 9:
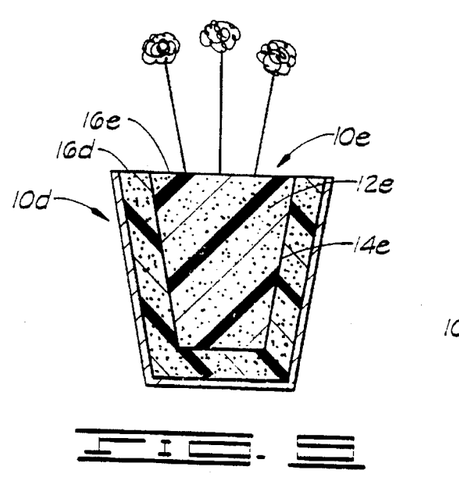
FIG. 9 is a sectional view of the floral container of FIG. 6 having a foam insert disposed therein.

Shown in FIG. 9 is a floral container 10d which contains a "nested" floral container 10e having an upper end 16e. The floral container 10e has a shape similar to the shape of the cavity 28 such that the floral container 10e can fit into the cavity 28. The floral container 10e has at least some portion of its external surface layer 14e which is permeable to water and thus does not comprise a completely water impermeable external surface layer as does the floral container 10d within which floral container 10e is contained. Therefore, water and nutrients are able to flow between the floral holding material 12d of the floral container 10d and the floral holding material 12e of the container 10e. Only a portion of the external surface layer 14e of the floral container 10e may be water permeable, or the entire external surface layer 14e of the floral container 10e may be water permeable. In one embodiment, the floral grouping 20 is placed into the floral container 10e first, then after a period of time, the floral container 10e which contains the floral grouping 20, is inserted into the cavity 28 of the floral container 10d for further disposition.

Water, fertilizer and other nutrients may be supplied to the floral containers 10–10d by their application to the upper surface 16–16d of the floral containers 10–10d. Alternatively, as indicated with floral container 10f having external surface layer 14f and upper end 16f shown in FIG. 10, water may be applied through a tube 34 inserted into the floral holding material 12f. The tube 34 has perforations 36 whereby when water is introduced into the tube 34 in direction 38, the water flows through the perforations 36 in direction 40 into the floral holding material 12f. Any of the embodiments 10–10e of the present invention may be adapted with a tube similar to tube 34 for moisture/nutrient application purposes. Alternatively, fertilizers, nutrients or other plant requirements could be impregnated into the holding material thereby eliminating the need for adding fertilizers, nutrients or other requirements via an irrigant.

Figure 10:
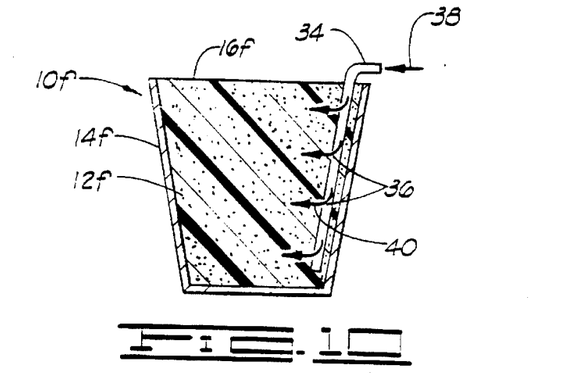
FIG. 10 is a sectional view of a floral container constructed in accordance with the present invention having a watering tube.
Figure 11:
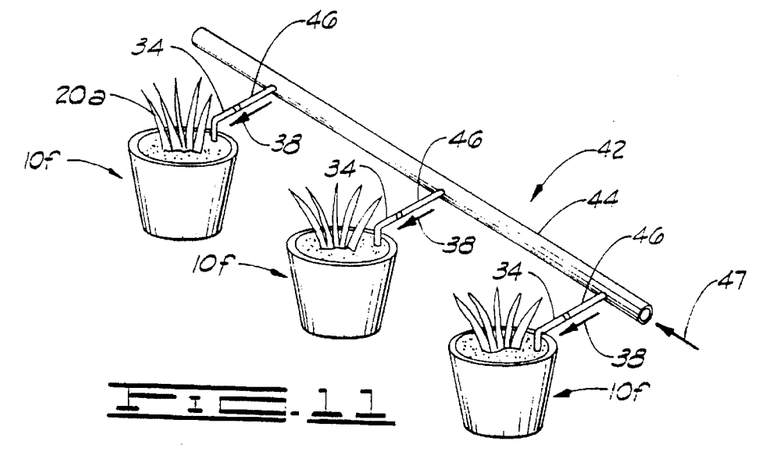
FIG. 11 is a perspective view of a floral container constructed in accordance with the present invention and having a tear strip in the external layer.

Shown in FIG. 11 and designated by the reference numeral 42 is a system for growing a plurality of botanical items or propagules 20a in a plurality of floral containers 10f constructed exactly the same as floral containers 10f shown in FIG. 10. Each container 10f has a tube 34 which is disposed in the floral holding material 12f of the container 10f. Each tube 34 is connected to a feeder pipe 44 via a feeder line 46. Water, fertilizer, nutrients or other materials are introduced into feeder pipe 44 in direction 47 and the water or other substances flow through the feeder lines 46 in direction 38 into tubes 34, thereby introducing the substances into the floral containers 10f.

Figure 12:
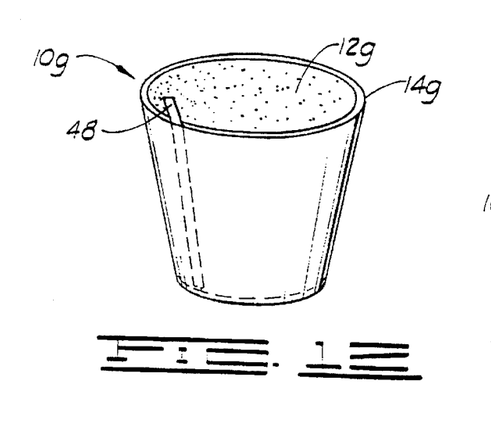
FIG. 12 is a perspective view of the floral container of FIG. 11 after the tear strip has been pulled downward.
Figure 13:
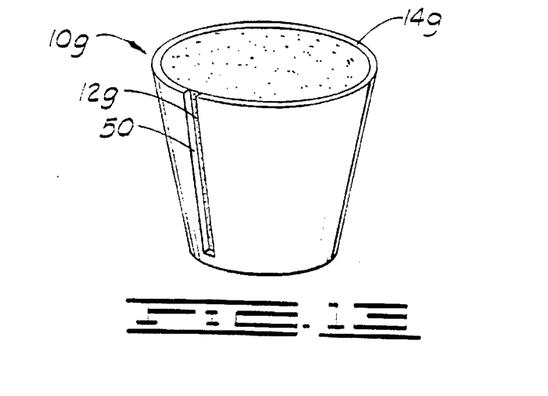
FIG. 13 is a perspective view of several of the floral containers of FIG. 10 attached to a watering system.

Shown in FIG. 12 and designated by the general reference number 10g is a floral container having floral holding material 12g therein and constructed exactly the same as the floral container 10f except that the container 10g has a tear strip 48 embedded in the external surface layer 14g. When the tear strip is peeled back in a downward motion, a groove 50 is caused in the external surface layer 14g as shown in FIG. 13. The groove 50 serves to expose a portion of the floral holding material 12g wherein the external surface layer 14g which is otherwise exactly like the layer 14 is rendered permeable to water and through which groove 50 water can pass into the floral holding material 12g to provide water or nutrients carried therein to floral grouping held by the floral holding material 12g.

Figures 14, 15, 16, 17:
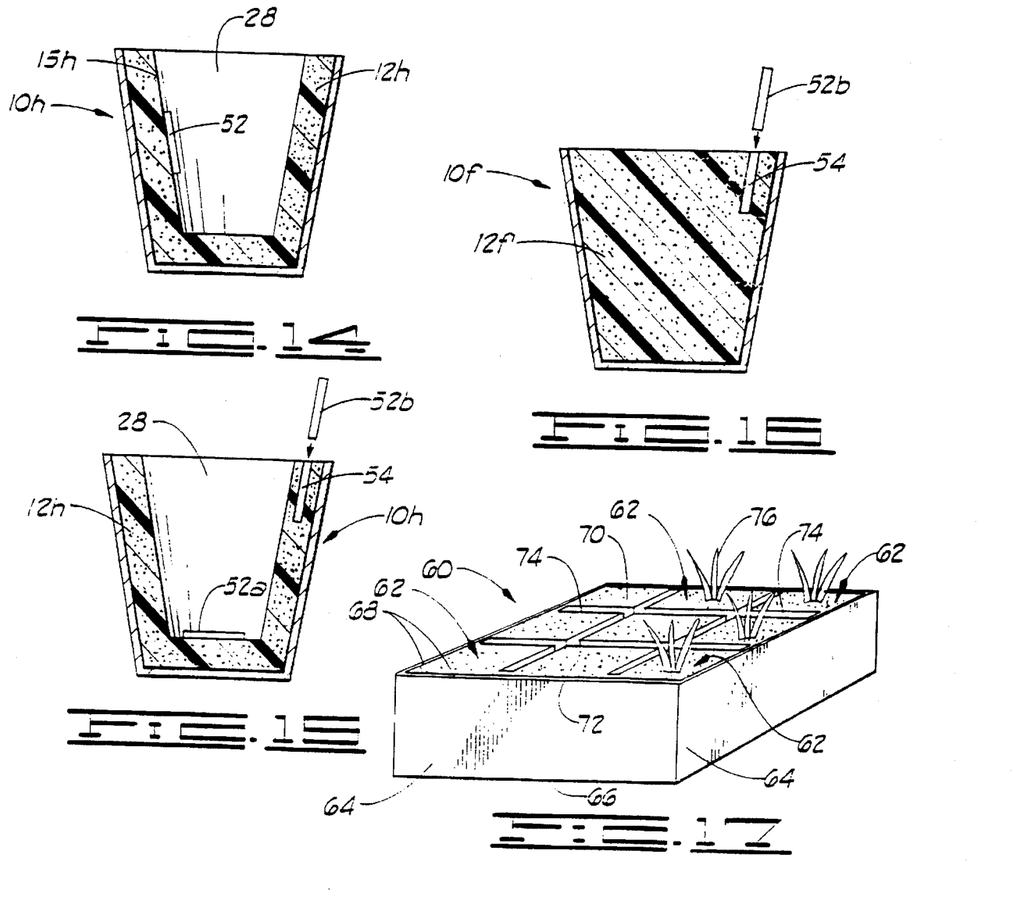
FIG. 14 is a sectional view of a floral container having a nutrient source.
FIG. 15 is a sectional view of another floral container having another nutrient source.
FIG. 16 is a sectional view of another floral container having a nutrient source.
FIG. 17 is a perspective view of a floral container constructed in the form of a growing tray or block constructed in accordance with the present invention.

Embodiments of FIGS. 14–16

Shown in FIG. 14 and designated by the reference numeral 10h is a floral container constructed exactly like floral container 10d in FIG. 6 except floral container 10h has a nutrient source 52 which may be attached to some portion of a floral holding material 12h and preferably attached to an inner surface 15h of the floral holding material 12h.

Alternatively, a nutrient source 52a may be placed in the bottom of the cavity 28 of the floral container 10h as shown in FIG. 15 or a nutrient source 52b may be disposed in an aperture 54 in the floral holding material 12h also as shown in FIG. 15. Similarly, the nutrient source 52b may be disposed in an aperture 54 in a solid floral container such as floral container 10f as shown in FIG. 16.

Embodiments of FIGS. 17–19

Shown in FIG. 17, and designated by the reference numeral 60 is a growing tray composed of a plurality of growing units 62. The growing tray 60 is constructed of the same floral holding material used to construct the floral containers 10–10h as shown in FIGS. 1–16. The external surface 64 and bottom surface 66 of the growing tray 60 has an external surface layer 68 which is comprised of the same material as the external surface layers 14–14h in FIGS. 1–16 and is impermeable to water. The upper surface 70 of the growing tray 60 is not covered with a water impermeable layer. The floral holding material 72 which comprises each growing unit 62 of the growing tray 60 may have a series of passageways or channels 74 to facilitate distribution of water, nutrients and fertilizers throughout the floral holding material 72. The growing tray 60 serves as a convenient substrate and growing medium for botanical items or propagules 76.

The growing tray 60 may be shipped to various distributors for further culture, shipping or sales. Alternatively, the growing tray 60 may be subdivided into subportions 62a made up of two or more growing units 62. Similarly, the growing tray 60 may be subdivided into separate individual subunits 62b such as shown in FIG. 18. Each subportion 62a or subunit 62b, after separation from the growing tray, has at least one water-permeable surface 78 through which water can pass to reach the botanical item or propagule 76. An individual subunit 62b can be purchased separately for transplanting elsewhere in another growing medium.

Alternatively, the subunit 62b can be transferred to another growing tray such as the growing tray designated by the reference numeral 80 in FIG. 19. Growing tray 80 is exactly the same as growing tray 60 except that it has a plurality of cavities 82 which are sufficiently sized to receive and contain individual subunits 62b. Transfer of the subunit 62b into growing tray 80 allows the botanical item 76 contained therein to continue its growth, perhaps to a larger size, or to a more mature or developed state. Even though the subunit 62b may have a residual water impermeable wall surface, the subunit 62b will have at least a partial water-permeable wall surface 78 as shown in FIG. 18. Thus, when a subunit 62b is deposited into an open cavity 82 of the growing tray 80, water can enter the floral holding material 72 of the subunit 62b to support continued growth of the botanical item 76. It will be understood by one of ordinary skill in the art that the growing trays 60 and 80 may be comprised of a variable number of individual subunits or cavities. The growing tray 80 may be provided with passageways or channels 84 similar in nature and function to the channels 74 of growing tray 60. The growing tray 80 may also be subdivided into subportions or subunits exactly the same as growing tray 60 for transplanting exactly the same as subunits 62b.

The growing trays 60 and 80 may be treated with perforations (not shown) which pass through the floral holding material comprising the trays 60 and 80 in such a configuration to facilitate the subdividing of the trays 60 and 80 into subunits and subportions. Subdivision of the trays 60 and 80 may be manual or automatic.

Figure 20:
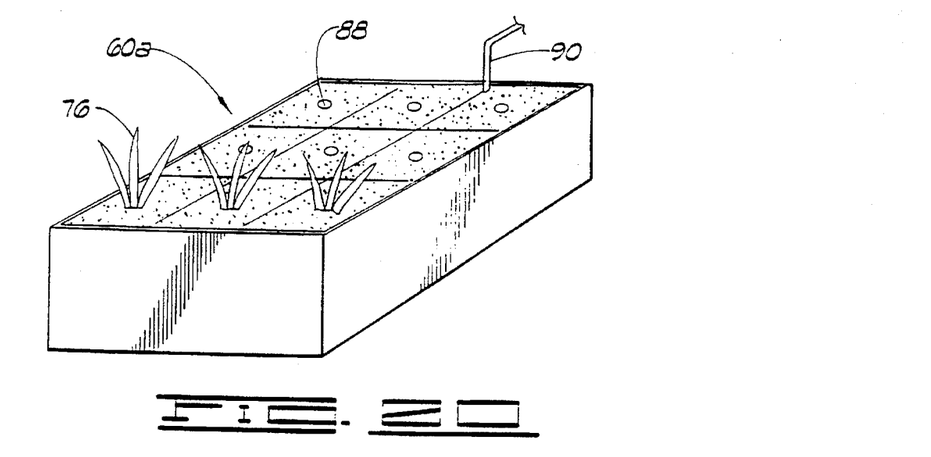
FIG. 20 is a perspective view of another floral container constructed in accordance with the present invention.
Figure 21:
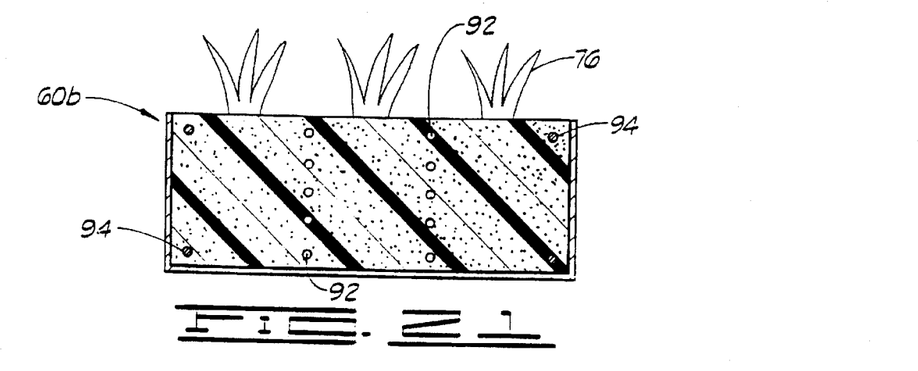
FIG. 21 is a sectional view of a floral container having channels and support rods disposed therein.

Embodiments of FIGS. 20–21

Shown in FIG. 20 and designated by the reference numeral 60a is a growing tray in which the watering channels are disposed within the interior of the floral holding material rather than on the upper surface as indicated for growing trays 60 and 80 in FIGS. 17–19. The growing tray 60a has indentations or holes 88 for receiving propagules. A tube 90 receives water from a water source which may be similar to the water source shown in FIG. 11, or which may be a water source supplying the single growing tray 60a. The water introduced through the tube 90 supplies interior passageways within the floral holding material.

Shown in FIG. 21 and designated by the reference numeral 60b is an embodiment of a growing tray having a plurality of passageways or channels 92 arranged within the interior of the floral holding material of the tray 60b. The tray 60b is exactly the same as growing tray 60a except growing tray 60b also has reinforcing rods or bars 94 which provide additional support for the growing tray 60b when it is moved. The reinforcing rods 94 may be comprised of paper, wood, plastic, metal or any other natural or synthetic stiffening material. Similarly, the tray may be reinforced with a mesh or net comprised of plastic, wire, rope or other natural or synthetic fibrous or mesh-like material.

Figure 22:
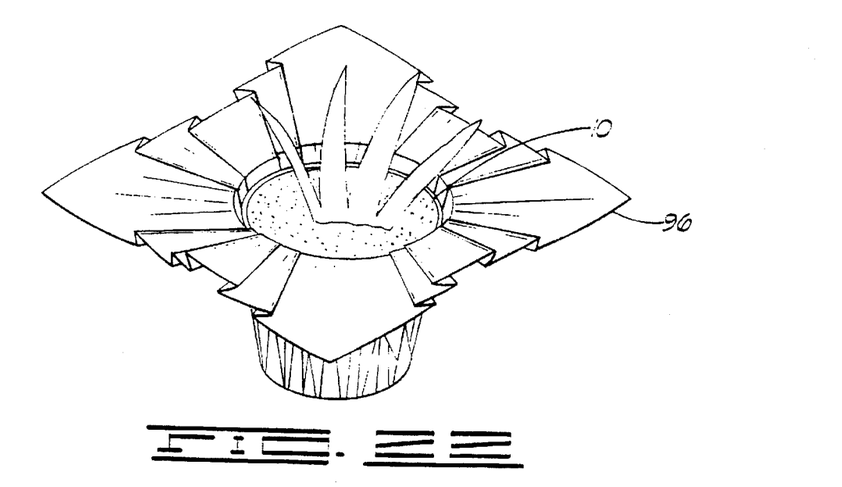
FIG. 22 is a perspective view of a floral container constructed in accordance with the present invention and covered with a decorative cover.

Embodiment of FIG. 22

Although the present invention contemplates a floral container having a water impermeable outer surface and thus experiences minimal or no leakage, there may be occasions when it is desired to cover the floral container 10 with a preformed decorative cover 96 as shown in FIG. 22. In this case, the floral container 10 is placed manually or automatically into the decorative cover 96 for display, sale or shipping or for further growth.

The decorative cover 96 may have a bonding material on its inner surface for bonding of the cover to the external surface of the floral container 10. Alternatively, a bonding material may be applied to the outer surface of the floral container 10 for bonding to the inner surface of the decorative cover 96. Alternatively, both the inner surface of the decorative cover 96 and the outer surface of the floral container 10 may have bonding materials applied thereto for causing bonding of the decorative cover 96 to the outer surface of the container 10.

The term "bonding material" as used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" as used herein also means a heat sealing lacquer which may be applied to the sheet of material and, in this instance, heat also must be applied to effect the sealing. The term "bonding material" as used herein means any type of material or thing which can be used to effect the bonding or connecting of the two adjacent portions of the material or sheet of material to effect the connection or bonding described herein.

Embodiments of FIGS. 23–26

There may be occasions when it is desirable to apply to the floral container not a preformed decorative cover 96 but rather a sheet of material which can be wrapped around the floral container and bound about the floral container.

Figure 23:
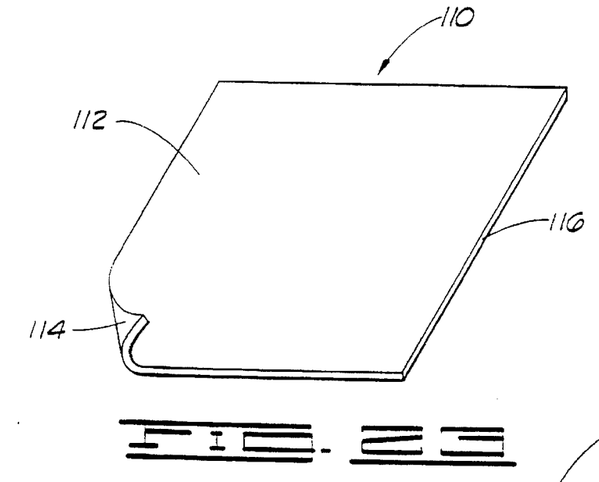
FIG. 23 is a perspective view of a sheet of material.

Shown in FIG. 23 and designated by the general reference numeral 110 is a sheet of material constructed in accordance with the present invention. The sheet of material 110 has an upper surface 112, a lower surface 114 and an outer peripheral surface 116.

The sheet of material 110 is constructed from any suitable flexible material that is capable of being wrapped or extended about a floral container (such as floral container 10 as described previously in FIG. 1) in the manner described below. Preferably, the sheet of material 110 is constructed of a material selected from a group of materials consisting of paper, metal foil, cloth (natural or synthetic or combinations thereof), denim, burlap, polymer film or cling material or combinations thereof.

The term "polymer film" as used herein means any polymer film. For example, but not by way of limitation, one polymer film is a polypropylene film. Another example of a polymer film, but not by way of limitation, is cellophane.

The sheet of material 110 has a thickness in a range from about 0.1 mils to about 30 mils. Preferably, the sheet of material 110 has a thickness in a range from about 0.1 mils to about 5 mils.

Figure 24:
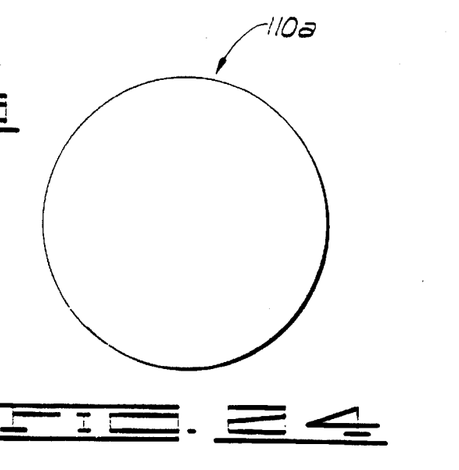
FIG. 24 is a plan view of another sheet of material.

The sheet of material 110 may be any shape and a square shape is shown in FIG. 23 only by way of example. The sheet of material may be a circular sheet of material 110a as shown in FIG. 24 or may be rectangular or any other geometric shape such as heart shape, for example.

The sheet of material 110 may be constructed of a single layer of material or a plurality of layers of the same or different types of materials. Any thickness of the sheet of material 110 may be utilized in accordance with the present invention as long as the sheet of material 110 is wrappable about a floral container 10, as described herein. Additionally, an insulating material such as bubble film, preferable as one of two or more layers, can be utilized in order to provide additional protection for the item wrapped therein. The layers of material comprising the sheet of material 110 may be connected together or laminated or may be separate layers.

A decorative pattern, such as a color and/or an embossed pattern, and/or other decorative surface ornamentation may be applied to the upper surface 112 and/or the lower surface 114 of the sheet of material 110 or portions thereof including, but not limited to printed design, coatings, colors, flocking or metallic finishes. The sheet of material 110 also may be totally or partially clear or tinted transparent material.

"Cling Wrap or Material" as used herein means any material which is capable of connecting to the sheet of material and/or itself upon contacting engagement during the wrapping process and is wrappable about an item whereby portions of the cling material contactingly engage and connect to other portions of the wrapping material for generally securing the sheet of material wrapped about at least a portion of the item. This connecting engagement is preferably temporary in that the wrapping material may be easily removed without tearing same, i.e., the cling material "clings" to the wrapping material. A wrapping material remains securely connected to and about the wrapped item until the wrapping material is torn therefrom.

The cling material is constructed and treated if necessary, from polyethylene such as Cling Wrap made by Glad®, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. The cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as described herein.

The sheet of material 110 is disposed adjacent the floral container 10 with the upper surface 112 of the sheet of material 110 being disposed adjacent the external surface layer 14 of the floral container 10. In this position, as shown in FIG. 25, the sheet of material 110 is extended about and covers a substantial portion of the floral container 10 leaving the upper end 16 of the floral container 10 substantially uncovered so that a floral grouping 20 contained therein extends outwardly from the upper end 16 of the floral container 10.

In this position, a crimped portion 132 is formed in the sheet of material 110 near the upper end 16 of the floral container 10. The crimped portion 132 is formed by crimping together portions of the sheet of material 110 to form the crimped portion 132. The crimped portion 132 extends a distance inwardly toward a central portion of the floral container 10. The crimped portion 132 preferably extends circumferentially about the upper end 16 of the floral container 10, although the crimped portion 132 could be formed only in portions of the sheet of material 110 thereby forming circumferentially spaced apart crimped portions if desired in a particular application.

Figure 25:
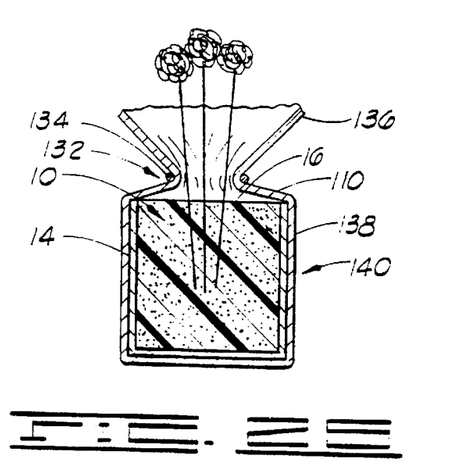
FIG. 25 is a sectional view of a floral container of the present invention surrounded and wrapped by a crimped sheet of material.

As shown in FIG. 25, the crimped portion 132 is formed by placing a band 134 about a portion of the sheet of material 110 with the band 134 gathering or bringing together portions of the sheet of material 110 pulling portions of the sheet of material 110 toward a central portion of the upper end 16 of the floral container 10 to form the crimped portion 132.

The term "band" as used herein means any material which may be secured about an object such as the floral container 10, such bands commonly being referred to as elastic bands or rubber bands and also includes any other type of material such as a string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material 110 to removably or substantially permanently form the crimped portion 132 and secure the crimped portion 132 formed in the sheet of material 110. The band 134 also may include a bow if desired in a particular application.

A portion of the sheet of material 110 near the outer periphery 116 thereof extends a distance above and beyond the crimped portion 132 to form a skirt 136 (FIG. 25) extending circumferentially about the upper end 16 of the floral container 10 and circumferentially about the floral grouping 20. The sheet of material 110 secured about the floral container 10 in the manner just described provides a decorative covering 138. The sheet of material 110 and the floral container 10 together with the means for forming the crimped portion 132 comprise a decorative assembly 140.

In one preferred embodiment, the band 134 is automatically placed about the sheet of material 110 using any one of a number of commercially available automatic or semi automatic banding machines such as the automatic shaping machine Model No. Power 260 available from Clements Industries, Inc., South Hackensack, N.J., or the machine Model No. Model BMNS Side Bender available from Saxmayer Corporation, Blissfield, Minn. (MN), for example. In this last mentioned embodiment, the floral container 10 with the sheet of material 110 extended thereabout is placed in the banding machine and the banding machine is activated to automatically place the band 134 about the sheet of material 110.

A system for automatically placing a band about a sheet of material disposed about a flower pot is disclosed in co-pending application entitled "BAND APPLICATOR FOR APPLYING A BAND ABOUT A SHEET OF MATERIAL AND A POT", U.S. Ser. No. 07/934,832, filed Aug. 24, 1992 and assigned to the assignee of the present invention and one disclosure of the letters application specifically is incorporated herein by reference. This system can be utilized for automatically placing the band 134 about the sheet of material 110 in accordance with the present invention.

In one other embodiment, the sheet of material 110 is placed about the floral container 10 and then placed in a holding device of the type disclosed in co-pending patent application entitled "METHOD AND APPARATUS FOR WRAPPING A FLORAL GROUPING WITH WATER HOLDING AND RELEASING MATERIAL", U.S. Ser. No. 07/922,293, filed Jul. 30, 1992 and assigned to the assignee of the present invention, the disclosure of which specifically hereby is incorporated herein by reference. This device includes a band holder. After the floral container 10 with the sheet of material 110 extended thereabout is placed in the holding device, the operator then takes a band from the band holder and pulls it over the holding device and onto the sheet of material 110.

Figure 26:
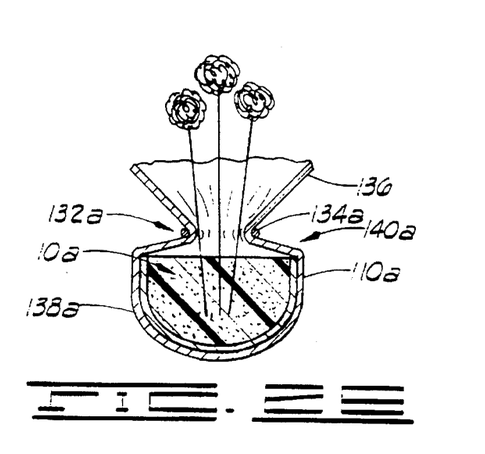
FIG. 26 is a sectional view of another floral container surrounded and wrapped by a crimped sheet of material.

Shown in FIG. 26 is a modified floral container 10a exactly the same as the floral container 10 shown in FIG. 25 and described in detail before, except the floral container 10a is in the shape of a solid basket.

The sheet of material 110a shown in FIG. 24 is disposed or extended about the floral container 10a. A crimped portion 132a is formed in the sheet of material 110a via a band 134a for cooperating to hold the sheet of material 110a in position about the floral container 10a to provide the decorative covering 138a to form the decorative assembly 140a.

Figure 27:
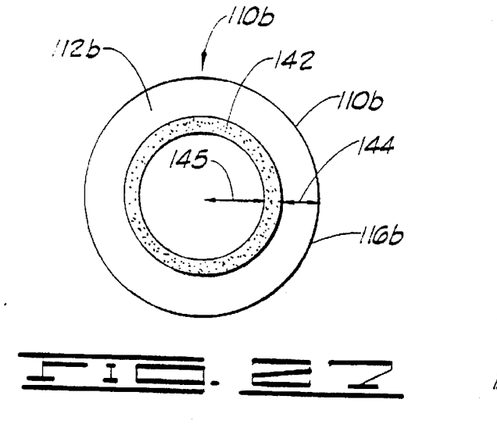
FIG. 27 is a plan view of a sheet of material having a bonding material disposed thereupon.
Figure 28:
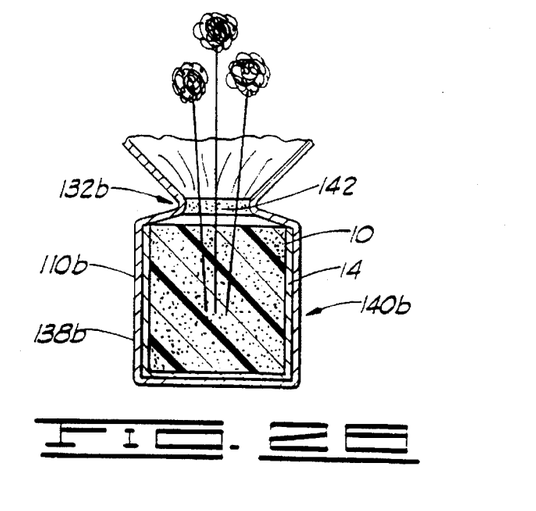
FIG. 28 is a sectional view of a floral container wrapped and decorated with the sheet of material of FIG. 27.

Embodiment of FIGS. 27–28

Shown in FIG. 27 is a modified sheet of material 110b which is constructed exactly like the sheet of material 110a shown in FIG. 24 and described in detail before, except the sheet of material 110b has a closure bonding material 142 (also referred to herein as "bonding material") disposed thereon. More particularly, the closure bonding material 142 is disposed on the upper surface 112b of the sheet of material 110b and the closure bonding material 142 is spaced a distance 144 from the outer periphery 116b of the sheet of material 110b. The closure bonding material 142 extends circumferentially about the sheet of material 110b. The closure bonding material 142 is spaced a distance 145 radially from a central portion of the sheet of material 110b. It should be noted that, although the closure bonding material 142 is shown in FIG. 27 in the form of a continuous strip of closure bonding material 142, the closure bonding material 142 may be in the form of spots or spaced-apart strips and the spots or strips may be of any geometric shape desired in a particular application.

Shown in FIG. 28 is a decorative assembly 140b comprising a floral container 10 which is constructed exactly like the floral container 10 shown in FIG. 1 and described in detail before.

In operation, the sheet of material 110b is extended about a portion of the external surface 14 of the floral container 10. The crimped portion 132b is formed in the sheet of material 110b by crimping together portions of the sheet of material 110b near the closure bonding material 142 and forming overlapping portions of the sheet of material 110b with the overlapping portions being substantially bonded via the closure bonding material 142 to form the crimped portion 132b. The crimped portion 132b will cooperate to hold the sheet of material 110b about the floral container 10 to provide the decorative covering 138b in a manner exactly like that described before with respect to the crimped portion 132b formed with the band 134 shown in FIG. 25, except in this instance the crimped portion 132b is formed by bringing together and bonding portions of the sheet of material 110b via the closure bonding material 142. The closure bonding material 142 is positioned on the upper surface 112b of the sheet of material 110b so that the crimped portion 132b is positioned above the upper end 16 of the floral container 10 as shown in FIG. 28.

The crimping of the sheet of material 110b may be accomplished by hand or with a machine or device.

Figure 29:
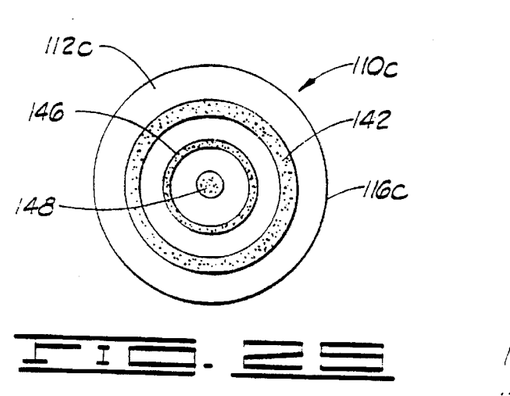
FIG. 29 is a plan view of a sheet of material having another pattern of bonding material disposed thereupon.
Figure 30:
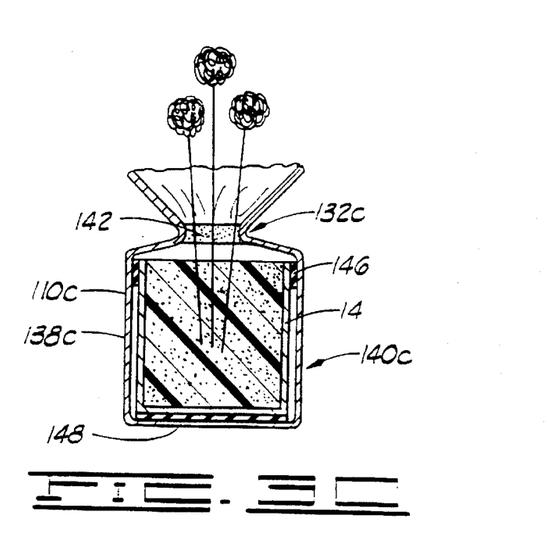
FIG. 30 is a sectional view of a floral container constructed in accordance with the present invention and wrapped and decorated with the sheet of material of FIG. 29.

Embodiment of FIGS. 29–30

Shown in FIG. 29 is a modified sheet of material 110c which is constructed exactly like the sheet of material 110b shown in FIG. 27, except the sheet of material 110c also includes a first pot bonding material 146 which extends circumferentially about a portion of the sheet of material 110c. A closure bonding material 142 is spaced a distance from the outer peripheral edge 116c of the sheet 110c. The first pot bonding material 146 is spaced a distance from the closure bonding material 142 and spaced a distance from a central portion of the sheet of material 110c. The sheet of material 110c may also include a second pot bonding material 148 which is disposed on the upper surface 112c of the sheet of material 110c with the second pot bonding material 148 covering a central portion of the sheet of material 110c.

Shown in FIG. 30 is a sectional view of a decorative assembly 140c comprising a floral container 10 which is constructed exactly like the floral container 10 shown in FIG. 1 and described in detail before. The sheet of material 110c is extended about the floral container 10 and the crimped portion 132c is formed in the sheet of material 110c in a manner exactly like that described before in connection with the sheet of material 110b shown in FIG. 28.

The first pot bonding material 146 is disposed on the sheet of material 110c and positioned thereon so that, when the sheet of material 110c is wrapped or extended about the floral container 10, the first pot bonding material 146 is disposed adjacent a portion of the external surface layer 14 near the upper end 16 of the floral container 10. The portion of the sheet of material 110c with the pot bonding material 146 thereon is bondingly connected to the external surface layer 14 of the floral container 10 for further cooperating to hold the sheet of material 110c extended about the floral container 10. In addition, the second pot bonding material 148, if present, is positioned on the sheet of material 110c so that the second pot bonding material 148 engages a portion of the lower end of the floral container 10 and is bondingly connected thereto for still further cooperating to hold the sheet of material 110c extended about the floral container 10 to form the decorative covering 138c and decorative assembly 140c.

The closure bonding material 142 and the pot bonding materials 146 and 148 may be disposed on the upper surface or the lower surface or both of the sheets of material 110 described herein or in any of the other positions described in the co-pending application Ser. No. 07/926,098 entitled "METHOD AND APPARATUS FOR FORMING A DECORATIVE COVER", filed on Aug. 5, 1992, Inventor: Donald E. Weder, owned by the Assignee of the present invention, the disclosure of which specifically hereby is incorporated herein by reference.

The present invention in particular is useful for providing a decorative covering using a sheet of material constructed of a material which is non-shape sustaining. "Non-shape sustaining" means that the material may be shaped about the form of the floral container, but the sheet of material will not hold that shape and will relax back into substantially the non-formed shape unless held in the formed shaped by some means such as the forming of the crimped portion in the sheet of material. By comparison, a shape sustaining sheet of material would be a material such as a metal foil for example which may be formed about the floral holding material and which will substantially maintain the formed shape.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a decorative assembly, comprising the steps of:

providing a container comprising:

a porous self-supporting holding material having an upper end, a lower end, and an outer peripheral surface extending between the upper end and the lower end, the holding material constructed of a material for receiving a portion of a floral grouping and supporting the floral grouping without a pot means, and an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material;

providing a floral grouping having a bloom end and a stem end;

providing a sheet of material having an upper surface, a lower surface and an outer periphery;

disposing the stem end of the floral grouping in the holding material and the holding material supporting the floral grouping with a portion of the floral grouping near the bloom end thereof extending a distance upwardly beyond the upper end of the holding material; and forming the sheet of material about the external surface layer of the container to conform to at least a portion of the external surface layer of the container to form a decorative cover about the container, the upper surface of the sheet of material being disposed adjacent a portion of the external surface layer of the container and the sheet of material extending about a portion of the external surface layer of the container and leaving uncovered a portion of the holding material near the upper end thereof, the floral grouping extending upwardly beyond the upper end of the holding material.

2. The method of claim 1 wherein the step of disposing the sheet of material about the container further comprises bonding the sheet of material to a portion of the external surface layer of the container.

3. The method of claim 2 wherein the step of bonding the sheet of material further comprises providing a sheet of material having a bonding material disposed on the upper surface of the sheet of material for bondingly engaging portions of the external surface layer of the container for cooperating to hold the sheet of material in position extended about the external surface layer of the container.

4. The method of claim 2 wherein the step of bonding the sheet of material further comprises forming a crimped portion in the sheet of material with the crimped portion cooperating to hold the sheet of material in the position extended about the container.

5. The method of claim 4 wherein step of forming the crimped portion of the sheet further comprises forming the crimped portion in the sheet of material at a position above the upper end of the container.

6. The method of claim 4 wherein the step of forming the crimped portion of the sheet further comprises forming the crimped portion in the sheet of material at a position near the upper end of the container.

7. The method of claim 4 wherein the step of forming the crimped portion further comprises providing the sheet of material with a closure bonding material being disposed on a portion of the sheet of material, and wherein the step of forming the crimped portion further comprises crimping a portion of the sheet of material near the closure bonding material and forming overlapping portions of the sheet of material with the overlapping portions being substantially bonded via the closure bonding material to form the crimped portion.

8. The method of claim 3 wherein in the step of providing a sheet of material having a bonding material disposed on the sheet of material and bonding the sheet of material to the outer peripheral surface of the holding material, the sheet of material engages the external surface layer near the upper end of the floral holding material for bondingly connecting portions of the sheet of material to the external surface layer of the container for cooperating to hold the sheet of material in position extended about the container to provide the decorative cover.

9. The method of claim 3 wherein in the step of bonding the sheet of material, the bonding material is disposed on the sheet of material and positioned thereon to engage a portion of the holding material near the lower end of the for bondingly connecting a portion of the sheet of material to the external surface layer of the container cooperating to hold the sheet of material in position extended about the container to provide the decorative cover.

10. The method of claim 1 wherein the step of disposing the stem end of the floral grouping in the holding material is defined further as supporting the floral grouping in a position extending a distance above the upper end of the holding material.

11. The method of claim 1 wherein in the step of providing the sheet of material further comprises providing the sheet of material constructed of a material selected from a group of materials consisting of paper, metal foil, cloth (natural or synthetic), denim, burlap or polymer film or combinations thereof.

12. The method of claim 11 wherein the step of providing the sheet of material further comprises providing the sheet of material having a thickness in a range from less than about 0.1 mils to about 30 mils.

13. The method of claim 1 wherein the step of providing the sheet of material further comprises providing the sheet of material constructed of a non-shaped sustaining material.

14. The method of claim 1 wherein in the step of providing the container, the container has a cavity which extends from the upper end a distance into the holding material.

15. The method of claim 1 wherein in the step of providing a container further comprises providing irrigation means for irrigating the holding material.

16. The method of claim 15 wherein the irrigation means further comprises a tube inserted into the holding material.

17. The method of claim 15 wherein the irrigation means further comprises a channel within the holding material.

18. The method of claim 1 wherein the step of providing a container further comprises disposing fertilizing means within the holding material.

19. The method of claim 1 wherein in the step of providing a container, the external surface layer further comprises a lacquer composition applied to the outer peripheral surface and lower end of the holding material.

20. The method of claim 1 wherein in the step of providing a container, the external surface layer further comprises a glazed layer formed by using glazing means to glaze the outer peripheral surface and the lower end of the holding material.

21. A method for providing a decorative assembly, comprising the steps of:

providing a container comprising:
a porous self-supporting holding material having an upper end, a lower end, and an outer peripheral surface extending between the upper end and the lower end, the holding material constructed of a material for receiving a portion of a floral grouping and supporting the floral grouping without a pot means, and an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material;

providing a floral grouping having a bloom end and a stem end;

providing a sheet of material having an upper surface, a lower surface and an outer periphery;

disposing the stem end of the floral grouping in the holding material and the holding material supporting the floral grouping with a portion of the floral grouping near the bloom end thereof extending a distance upwardly beyond the upper end of the holding material;

disposing the sheet of material about the external surface layer of the container to form a decorative cover, the upper surface of the sheet of material being disposed adjacent a portion of the external surface layer of the container and the sheet of material extending about a portion of the external surface layer of the container and leaving uncovered a portion of the holding material near the upper end thereof, the floral grouping extending upwardly beyond the upper end of the holding material; and forming a crimped portion in the sheet of material by disposing a band about a portion of the sheet of material for pulling the sheet of material inwardly toward a central portion of the holding material with the crimped portion cooperating to hold the sheet of material in the position extended about the container.

22. A method for providing a decorative assembly, comprising the steps of:

providing a container comprising:
 a porous self-supporting holding material having an upper end, a lower end, and an outer peripheral surface extending between the upper end and the lower end, the holding material constructed of a material for receiving a portion of a floral grouping and supporting the floral grouping without a pot means and the holding means comprising support means disposed therein for additional support and reinforcement to the holding material, and
 an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material;

providing a floral grouping having a bloom end and a stem end;

providing a sheet of material having an upper surface, a lower surface and an outer periphery;

disposing the stem end of the floral grouping in the holding material and the holding material supporting the floral grouping with a portion of the floral grouping near the bloom end thereof extending a distance upwardly beyond the upper end of the holding material; and disposing the sheet of material about the external surface layer of the container to form a decorative cover, the upper surface of the sheet of material being disposed adjacent a portion of the external surface layer of the container and the sheet of material extending about a portion of the external surface layer of the container and leaving uncovered a portion of the holding material near the upper end thereof, the floral grouping extending upwardly beyond the upper end of the holding material.

23. The method claim 22 wherein the step of providing support means further comprises disposing the support means at the interface between the outer peripheral surface of the holding material and the external surface layer.

24. A method for providing a decorative assembly, comprising the steps of:

providing a container comprising:
 a porous self-supporting holding material having an upper end, a lower end, and an outer peripheral surface extending between the upper end and the lower end, the holding material constructed of a material for receiving a portion of a floral grouping and supporting the floral grouping without a pot means,
 an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material, and
 a floral grouping having a bloom end and a stem end, the stem end of the floral grouping disposed in the holding material and the holding material supporting the floral grouping with a portion of the floral grouping near the bloom end thereof extending a distance upwardly beyond the upper end of the holding material;

providing a sheet of material having an upper surface, a lower surface and an outer periphery; and forming the sheet of material about the external surface layer of the container to conform to at least a portion of the external surface layer of the container to form a decorative cover about the container, the upper surface of the sheet of material being disposed adjacent a portion of the external surface layer of the container, the sheet of material extending about the external surface layer of the container, the bloom end of the floral grouping extending upwardly beyond the upper end of the holding material.

25. The method of claim 24 wherein in the step of providing the sheet of material, the sheet of material has been preformed into a decorative cover prior to its disposal about the external surface layer of the container, the cover having an inner surface, an outer surface and an opening adapted to receive the container and wherein the upper surface of the sheet generally comprises the inner surface of the cover and the lower surface of the sheet generally comprises the outer surface of the cover.

26. The method of claim 24 wherein the step of disposing the sheet of material about the container further comprises bonding the sheet of material to a portion of the external surface layer of the container.

27. The method of claim 24 wherein in the step of providing a sheet of material, the sheet of material is further defined as having a bonding material disposed on the upper surface for bonding portions of the sheet to portions of the external surface layer of the container for holding the sheet of material in a position extended about the external surface layer of the container.

28. The method of claim 24 wherein the step of disposing the sheet of material about the container further comprises crimping a portion of the sheet of material to form a crimped portion, the crimped portion cooperating to hold the sheet of material in the position extended about the container.

29. The method of 28 wherein the crimped portion of the sheet is crimped automatically.

30. The method of claim 28 wherein step of crimping a portion of the sheet further comprises forming the crimped portion in the sheet of material at a position above the upper end of the container.

31. The method of claim 28 wherein the step of forming the crimped portion of the sheet further comprises forming the crimped portion in the sheet of material at a position near the upper end of the container.

32. The method of claim 28 wherein the step of forming the crimped portion further comprises crimping together portions of a closure bonding material disposed on the sheet of material with the portions of the sheet of material near the closure bonding material and forming overlapping portions of the sheet of material with the overlapping portions being substantially bonded via the closure bonding material to form the crimped portion.

33. The method of claim 27 wherein the bonding material is further defined as being disposed on the sheet of material for engaging portions of the external surface layer of the container near the upper end of the container and bondingly connecting portions of the sheet of material to the external surface layer of the container for cooperating to hold the sheet of material in position extended about the container to provide the decorative cover.

34. The method of claim 27 wherein the bonding material is further defined as being disposed on the sheet of material and positioned thereon to engage a portion of the external surface layer of the container near the lower end of the container for bondingly connecting a portion of the sheet of material to the container thereby cooperating to hold the sheet of material in position extended about the container to provide the decorative cover.

35. The method of claim 24 wherein in the step of providing the sheet of material, the sheet of material is defined further as being constructed of a material selected from a group of materials consisting of paper, metal foil, cloth (natural or synthetic), denim, burlap or polymer film or combinations thereof.

36. The method of claim 35 wherein the sheet of material is defined further as having a thickness in a range from less than about 0.1 mils to about 30 mils.

37. The method of claim 24 wherein the sheet of material is defined further as being a non-shape sustaining material.

38. The method of claim 24 wherein in the step of providing a container the holding material has a cavity which extends from the upper end a distance into the floral holding material.

39. The method of claim 24 wherein the step of providing the container further comprises providing irrigation means for irrigating the holding material.

40. The method of claim 39 wherein the irrigation means further comprises a tube inserted into the holding material.

41. The method of claim 39 wherein the irrigation means further comprises a channel within the holding material.

42. The method of claim 24 wherein the in the step of providing the container, the container further comprises fertilizing means disposed within the holding material.

43. The method of claim 24 wherein in the step of providing a container, the external surface layer further comprises a lacquer composition applied to the outer peripheral surface and lower end of the holding material.

44. The method of claim 24 wherein in the step of providing a container, the external surface layer further comprises a glazed layer formed by using glazing means to glaze the outer peripheral surface and the lower end of the holding material.

45. A method for providing a decorative assembly, comprising the steps of:

providing a container comprising:
a porous self-supporting holding material having an upper end, a lower end, and an outer peripheral surface extending between the upper end and the lower end, the holding material constructed of a material for receiving a portion of a floral grouping and supporting the floral grouping without a pot means,
an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material, and
a floral grouping having a bloom end and a stem end, the stem end of the floral grouping disposed in the holding material and the holding material supporting the floral grouping with a portion of the floral grouping near the bloom end thereof extending a distance upwardly beyond the upper end of the holding material;

providing a sheet of material having an upper surface, a lower surface and an outer periphery;

disposing the sheet of material about the external surface layer of the container to form a decorative cover, the upper surface of the sheet of material being disposed adjacent a portion of the external surface layer of the container, the sheet of material extending about the external surface layer of the container, the bloom end of the floral grouping extending upwardly beyond the upper end of the holding material; and forming a crimped portion above the upper end of the holding material, with at least portions of the crimped portion extending inwardly toward a central portion of the holding material and the crimped portion further comprising at least some portions which extend circumferentially about the upper end of the holding material with the crimped portion cooperating to hold the sheet of material in the position extended about the container.

46. A method for providing a decorative assembly, comprising the steps of:

providing a container comprising:
a porous self-supporting holding material having an upper end, a lower end, and an outer peripheral surface extending between the upper end and the lower end, the holding material constructed of a material for receiving a portion of a floral grouping and supporting the floral grouping without a pot means,
an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material, and
a floral grouping having a bloom end and a stem end, the stem end of the floral grouping disposed in the holding material and the holding material supporting the floral grouping with a portion of the floral grouping near the bloom end thereof extending a distance upwardly beyond the upper end of the holding material;

providing a sheet of material having an upper surface, a lower surface and an outer periphery;

disposing the sheet of material about the external surface layer of the container to form a decorative cover, the upper surface of the sheet of material being disposed adjacent a portion of the external surface layer of the container, the sheet of material extending about the external surface layer of the container, the bloom end of the floral grouping extending upwardly beyond the upper end of the holding material; and forming a crimped portion in the sheet of material by disposing a band about a portion of the sheet of material for pulling the sheet inwardly toward a central portion of the holding material with the crimped portion cooperating to hold the sheet of material in the position extended about the container.

47. A method for providing a decorative assembly, comprising the steps of:
    providing a container comprising:
        a porous self-supporting holding material having an upper end, a lower end, and an outer peripheral surface extending between the upper end and the lower end, the holding material constructed of a material for receiving a portion of a floral grouping and supporting the floral grouping without a pot means, and the holding means comprising support means disposed therein for additional support and reinforcement to the holding material, and
        an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material, and
        a floral grouping having a bloom end and a stem end, the stem end of the floral grouping disposed in the holding material and the holding material supporting the floral grouping with a portion of the floral grouping near the bloom end thereof extending a distance upwardly beyond the upper end of the holding material;
    providing a sheet of material having an upper surface, a lower surface and an outer periphery; and
    disposing the sheet of material about the external surface layer of the container to form a decorative cover, the upper surface of the sheet of material being disposed adjacent a portion of the external surface layer of the container, the sheet of material extending about the external surface layer of the container, the bloom end of the floral grouping extending upwardly beyond the upper end of the holding material.

48. The method of claim 47 wherein the support means is disposed at the interface between the outer peripheral surface of the holding material and the external surface layer.

49. A method for providing a decorative assembly, comprising the steps of:
    providing a container comprising:
        a porous self-supporting holding material having an upper end, a lower end, and an outer peripheral surface extending between the upper end and the lower end, the holding material constructed of a material for receiving a portion of a floral grouping and supporting the floral grouping without a pot means, and
        an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material;
    providing a floral grouping having a bloom end and a stem end;
    providing a sheet of material having an upper surface, a lower surface and an outer periphery;
    forming the sheet of material about the external surface layer of the container to conform to at least a portion of the external surface layer of the container to form a decorative cover about the container, the upper surface of the sheet of material being disposed adjacent a portion of the external surface layer of the container and the sheet of material extending about a portion of the external surface layer of the container and leaving uncovered a portion of the holding material near the upper end thereof; and
    disposing the stem end of the floral grouping in the holding material and the holding material supporting the floral grouping with a portion of the floral grouping near the bloom end thereof extending a distance upwardly beyond the upper end of the holding material.

50. A method for providing a decorative assembly, comprising the steps of:
    providing a container comprising:
        a porous self-supporting holding material having an upper end, a lower end, and an outer peripheral surface extending between the upper end and the lower end, the holding material constructed of a material for receiving a portion of a floral grouping and supporting the floral grouping without a pot means, and
        an external surface layer covering the lower end and outer peripheral surface of the holding material and integral thereto, the external surface layer having the property of being substantially impermeable to an irrigant introduced into the porous self-supporting holding material, the external surface layer serving to retain the irrigant within the holding material;
    providing a floral grouping having a bloom end and a stem end;
    providing a sheet of material having an upper surface, a lower surface and an outer periphery;
    disposing the stem end of the floral grouping in the holding material and the holding material supporting the floral grouping with a portion of the floral grouping near the bloom end thereof extending a distance upwardly beyond the upper end of the holding material;
    disposing the sheet of material about the external surface layer of the container to form a decorative cover, the upper surface of the sheet of material being disposed adjacent a portion of the external surface layer of the container and the sheet of material extending about a portion of the external surface layer of the container and leaving uncovered a portion of the holding material near the upper end thereof, the floral grouping extending upwardly beyond the upper end of the holding material; and
    forming a crimped portion in the sheet of material above the upper end of the holding material, with at least portions of the crimped portion extending inwardly toward a central portion of the holding material and the crimped portion further comprising at least some portions which extend circumferentially about the upper end of the holding material with the crimped portion cooperating to hold the sheet of material in the position extended about the container.

* * * * *